(12) United States Patent
Imakita (10) Patent No.: US 11,835,944 B2
(45) Date of Patent: Dec. 5, 2023

(54) UPGRADE EVALUATION METHOD AND UPGRADE EVALUATION DEVICE

(71) Applicant: Mitsubishi Power, Ltd., Kanagawa (JP)

(72) Inventor: Koji Imakita, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 106 days.

(21) Appl. No.: 17/056,240

(22) PCT Filed: Jun. 24, 2019

(86) PCT No.: PCT/JP2019/024861
§ 371 (c)(1),
(2) Date: Nov. 17, 2020

(87) PCT Pub. No.: WO2020/008925
PCT Pub. Date: Jan. 9, 2020

(65) Prior Publication Data
US 2021/0216431 A1 Jul. 15, 2021

(30) Foreign Application Priority Data
Jul. 3, 2018 (JP) .................................. 2018-127079

(51) Int. Cl.
*G05B 23/02* (2006.01)
*G06Q 10/04* (2023.01)
(Continued)

(52) U.S. Cl.
CPC ................ *G05B 23/02* (2013.01); *F02C 9/00* (2013.01); *G05B 23/0294* (2013.01);
(Continued)

(58) Field of Classification Search
CPC ........ G06Q 50/06; G06Q 10/06; G06Q 10/04; G06Q 10/0639; G06Q 30/0283;
(Continued)

(56) References Cited

U.S. PATENT DOCUMENTS 6,775,595 B1 8/2004 Yabutani et al.
2002/0007388 A1 1/2002 Bannai et al.
(Continued)

FOREIGN PATENT DOCUMENTS

JP 2001-155090 6/2001
JP 2002-032438 1/2002
(Continued)

OTHER PUBLICATIONS

International Search Report dated Sep. 10, 2019 in corresponding International (PCT) Application No. PCT/JP2019/024861, with English Translation.
(Continued)

*Primary Examiner* — Yoshihisa Ishizuka
*Assistant Examiner* — Carter W Ferrell
(74) *Attorney, Agent, or Firm* — Wenderoth, Lind & Ponack, L.L.P.

(57) ABSTRACT

Provided is an upgrade evaluation device for calculating cost in relation to the introduction effects of an upgrade menu. The present invention has: a performance data acquisition step for acquiring the performance data of an apparatus; and an effect calculation step for calculating, on the basis of the performance data, introduction effects based on a difference in performance when an improvement function for improving the performance of the apparatus is introduced and when the improvement function is not introduced; the introduction effects being calculated for each of a plurality of points in time in a prescribed period in the effect calculation step. There may also be calculated a cost exchanged between an improvement-function-supply side and the supplied side, the cost being based on the introduction effects calculated in the effect calculation step.

13 Claims, 8 Drawing Sheets

(51) Int. Cl.
*G06Q 50/06* (2012.01)
*G06Q 30/0283* (2023.01)
*F02C 9/00* (2006.01)

(52) U.S. Cl.
CPC ......... *G06Q 10/04* (2013.01); *G06Q 30/0283* (2013.01); *G06Q 50/06* (2013.01)

(58) Field of Classification Search
CPC . G06Q 50/04; G06F 11/3442; G06F 11/3409; Y04S 50/16; Y04S 50/10; Y04S 10/50; Y04S 50/12; Y02P 80/10; H02J 3/008; F02C 9/00; Y02E 20/16; G05B 23/02; G05B 23/0294; F05D 2260/80; F05D 21/003; F05D 25/00
See application file for complete search history.

(56) References Cited

U.S. PATENT DOCUMENTS

| | | | | |
|---|---|---|---|---|
| 2002/0035496 A1* | 3/2002 | Fukushima | ...... | G06Q 10/06375 705/7.29 |
| 2005/0143876 A1* | 6/2005 | Tanase | ...... | G05B 15/02 701/22 |
| 2007/0094043 A1* | 4/2007 | Bannai | ...... | G06Q 10/06375 705/412 |
| 2008/0275802 A1* | 11/2008 | Verfuerth | ...... | G06Q 50/06 705/412 |
| 2009/0177331 A1* | 7/2009 | Yabutani | ...... | H02J 3/008 705/412 |
| 2013/0018821 A1* | 1/2013 | Shao | ...... | G06Q 50/06 705/412 |
| 2015/0100171 A1* | 4/2015 | Behrangrad | ...... | H02J 3/12 700/291 |
| 2015/0212975 A1* | 7/2015 | Inoue | ...... | G06F 17/18 703/2 |
| 2015/0253795 A1* | 9/2015 | Saito | ...... | G06Q 50/06 700/291 |

FOREIGN PATENT DOCUMENTS

| | | |
|---|---|---|
| JP | 2002-092075 | 3/2002 |
| JP | 2003-016167 | 1/2003 |
| JP | 2004-030565 | 1/2004 |
| JP | 2006-146554 | 6/2006 |
| JP | 2010-179294 | 8/2010 |

OTHER PUBLICATIONS

Written Opinion dated Sep. 10, 2019 in corresponding International (PCT) Application No. PCT/JP2019/024861, with English Translation.

* cited by examiner

FIG. 2

| INTRODUCTION EFFECT | CONSIDERATION (ON MONTHLY BASIS) | CONSIDERATION (ON HALF-YEAR BASIS) |
|---|---|---|
| -0.1% | -1000 | -6000 |
| 0% | 0 | 0 |
| 0.1% | 1000 | 6000 |
| 0.2% | 2000 | 12000 |
| 0.3% | 3000 | 18000 |
| ... | ... | ... |
| 1.0% | 10000 | 60000 |

FIG. 3

| | MEASURE CONSIDERATION ON MONTHLY BASIS | | MEASURE CONSIDERATION ON HALF-YEAR BASIS | | RELATED METHOD | |
|---|---|---|---|---|---|---|
| | EFFECT | CONSIDERATION | EFFECT | CONSIDERATION | EFFECT (GUARANTEED VALUE 0.07%) | CONSIDERATION |
| JANUARY | 0.1% | 1000 | - | - | - | - |
| FEBRUARY | 0.2% | 2000 | - | - | - | - |
| MARCH | -0.1% | -1000 | - | - | - | - |
| APRIL | 0.1% | 1000 | - | - | - | - |
| MAY | 0.1% | 1000 | - | - | - | - |
| JUNE | 0.1% | 1000 | 0.1% | 6000 | 0.1% | 6000 |
| JULY | 0% | 0 | - | - | - | - |
| AUGUST | 0.05% | 500 | - | - | - | - |
| SEPTEMBER | 0% | 0 | - | - | - | - |
| OCTOBER | 0.05% | 500 | - | - | - | - |
| NOVEMBER | 0% | 0 | - | - | - | - |
| DECEMBER | 0.1% | 1000 | 0.03% | 1800 | 0.03% | 0 |

UPGRADE EVALUATION METHOD AND UPGRADE EVALUATION DEVICE

TECHNICAL FIELD

The present invention relates to an upgrade evaluation method and an upgrade evaluation device.

The present application claims priority based on Japanese Patent Application No. 2018-127079 filed in Japan on Jul. 3, 2018, the contents of which are incorporated herein by reference.

BACKGROUND ART

In power plants such as gas turbines, upgrade menus (components, control logics, or the like) are provided to improve performance. When introducing the upgrade menus, a guaranteed value for the effect is set, and when the improvement in performance after the introduction reaches the guaranteed value, the user pays a predetermined amount of money to the manufacturer. On the other hand, when the improvement in performance is less than the guaranteed value, the manufacturer may pay a predetermined amount of money as a penalty to the user.

In addition, for example, when an upgrade menu with a small effect of introduction is introduced, it may be difficult to verify whether or not the guaranteed value has been achieved, so the manufacturer may not present the guaranteed value to the user. In such a case, the user tends to hesitate to introduce the upgrade menu because the guarantee cannot be obtained.

As a related technique, in PTL 1, it is described that in a plant diagnostic service of a power plant, gains such as a saving amount of fuel and an increase amount of generated electric power due to improvement of energy efficiency resulting from the diagnosis are measured, and a diagnostic service provider is paid an amount according to the gain actually obtained.

CITATION LIST

Patent Literature

[PTL 1] Japanese Unexamined Patent Application Publication No. 2003-16167

SUMMARY OF INVENTION

Technical Problem

When introducing an upgrade menu, both the manufacturer and the user have risks. For example, the manufacturer has a risk of being required to set a guaranteed value, which makes it difficult to secure profit. The user has a risk, for example, that an effect commensurate with the introduction cost cannot be obtained. When introducing the upgrade menu, it is desired to establish an agreement that reduces the risks of both manufacturers and users.

The present invention provides an upgrade evaluation method and an upgrade evaluation device capable of solving the above-described problems.

Solution to Problem

According to an aspect of the present invention, an upgrade evaluation method includes a performance data acquisition step of acquiring performance data of an apparatus; and an effect calculation step of calculating, based on the performance data, an introduction effect based on a difference in performance between when an improvement function of improving the performance of the apparatus is introduced and when the improvement function is not introduced, wherein in the effect calculation step, the introduction effect is calculated for each of a plurality of time points in a predetermined period.

According to an aspect of the present invention, the upgrade evaluation method further includes a consideration calculation step of determining a size of consideration which is for the introduction effect exchanged between a provider and a recipient of the improvement function, and is determined according to a degree of the introduction effect, wherein in the consideration calculation step, the consideration based on the introduction effect calculated in the effect calculation step is calculated for each of the plurality of time points.

According to an aspect of the present invention, in the consideration calculation step of the upgrade evaluation method, when the introduction effect is positive, the consideration to be paid from the recipient to the provider is calculated.

According to an aspect of the present invention, in the consideration calculation step of the upgrade evaluation method, when the introduction effect is negative, the consideration to be paid from the provider to the recipient is calculated.

According to an aspect of the present invention, the upgrade evaluation method further includes an external factor evaluation step of removing, from the performance data, an influence of an operating environment and an operating condition of the apparatus on the performance of the apparatus, wherein in the effect calculation step, the introduction effect is calculated based on the performance data after the influence of the operating environment is removed in the external factor evaluation step.

According to an aspect of the present invention, the improvement function in the upgrade evaluation method is a control logic of the apparatus, and introduction and non-introduction of the improvement function is switched by execution and non-execution of the control logic, and in the effect calculation step, the introduction effect is calculated based on the difference in performance between when the control logic is executed and when the control logic is not executed.

According to an aspect of the present invention, in the effect calculation step of the upgrade evaluation method, the introduction effect when the control logic is executed is calculated based on the difference in performance between the performance when the control logic is not executed immediately before or immediately after the control logic is executed and the performance when the control logic is executed.

According to an aspect of the present invention, the improvement function in the upgrade evaluation method is a component to be introduced into the apparatus, and in the effect calculation step, the introduction effect is calculated based on the difference in performance before and after the introduction of the component.

According to an aspect of the present invention, the upgrade evaluation method further includes a setting reception step of receiving an input of a setting of a calculation timing of the introduction effect in the predetermined period.

According to an aspect of the present invention, in the upgrade evaluation method, the predetermined period is one year, and in the setting reception step, the input of the setting indicating that the introduction effect is calculated in units of one month or less is received.

According to an aspect of the present invention, in the upgrade evaluation method, the predetermined period is one year, and in the setting reception step, the input of the setting indicating that the introduction effect is calculated in units of one day or less is received.

According to another aspect of the present invention, an upgrade evaluation device includes a performance data acquisition unit that acquires performance data of an apparatus; and an effect calculation unit that calculates, based on the performance data, an introduction effect based on a difference in performance between when an improvement function of improving the performance of the apparatus is introduced and when the improvement function is not introduced, wherein the effect calculation unit calculates the introduction effect for each of a plurality of time points in a predetermined period.

According to still another aspect of the present invention, the upgrade evaluation device further includes a consideration calculation unit that determines a size of consideration which is for the introduction effect exchanged between a provider and a recipient of the improvement function, and is determined according to a degree of the introduction effect, wherein the consideration calculation unit calculates the consideration based on the introduction effect for each of the plurality of time points.

Advantageous Effects of Invention

According to the above-described upgrade evaluation method and upgrade evaluation device, by appropriately calculating the consideration for the effect of introducing an upgrade menu, it is possible to reduce the risk of both the user and the manufacturer when introducing the upgrade menu.

DESCRIPTION OF EMBODIMENTS

First Embodiment

Hereinafter, a method of calculating a consideration for the effect of introducing an upgrade menu according to the first embodiment of the present invention will be described with reference to FIGS. 1 to 6.

Figure 1:
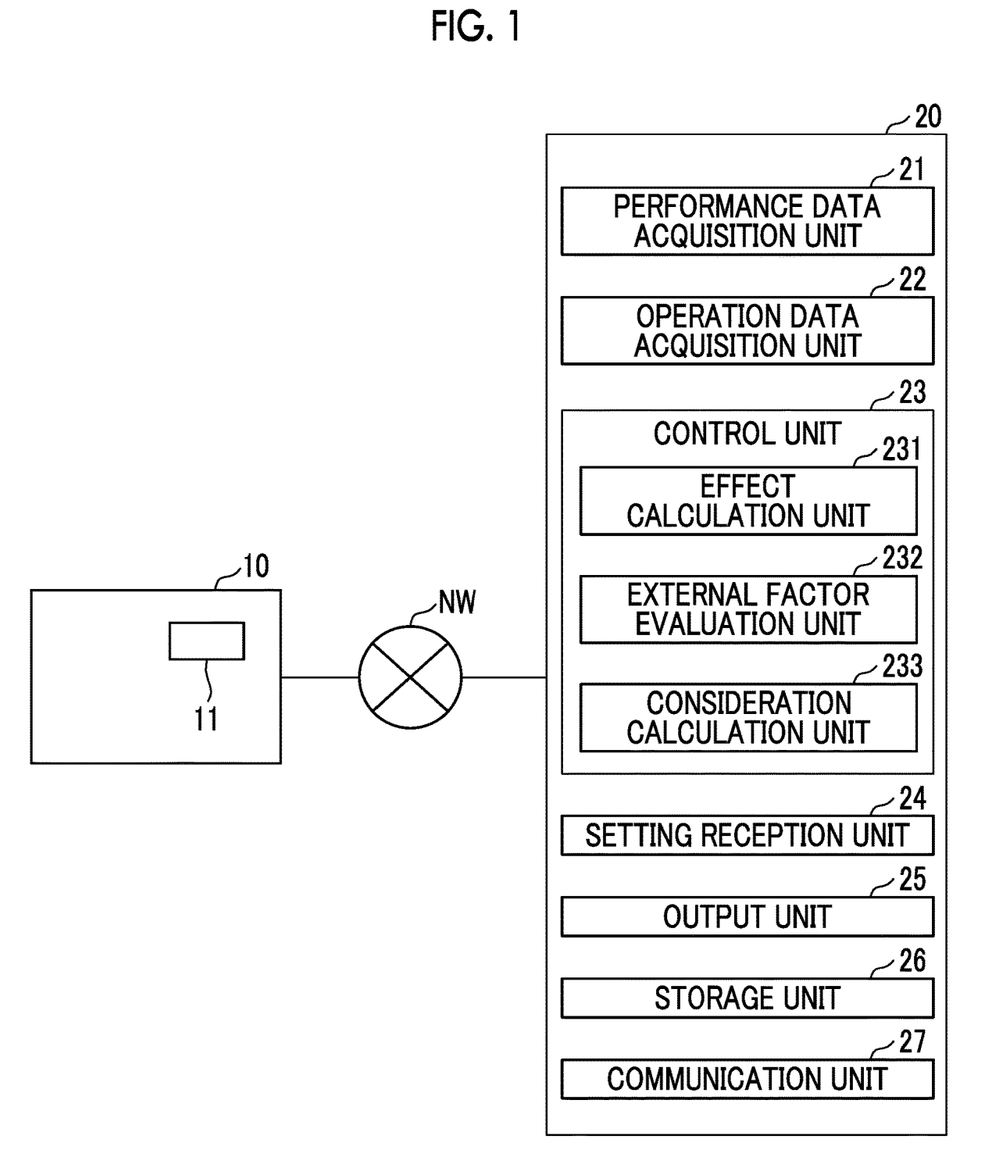
FIG. 1 is a block diagram of a plant and a consideration calculation device according to a first embodiment of the present invention.

FIG. 1 is a block diagram of a plant and a consideration calculation device according to a first embodiment of the present invention.

The plant 10 illustrated in FIG. 1 is, for example, a power plant, a chemical plant, a refuse incineration plant, or the like. When the plant 10 is a power plant, the plant 10 includes apparatuses such as a gas turbine, a steam turbine, and a generator. The plant 10 includes a control device 11 that controls these apparatuses. The control device 11 acquires operation data indicating an operating state and an operating environment of the apparatus, from each apparatus and a sensor, and controls the apparatus such as a gas turbine such that the plant 10 generates a desired electric power while monitoring the acquired operation data. The control device 11 uses the operation data to calculate performance data of the plant 10, such as the output efficiency of the gas turbine. The output efficiency of the gas turbine can be calculated, for example, based on the output of the gas turbine with respect to the amount of fuel input to the gas turbine. The manufacturer of the apparatus of the plant 10 provides an upgrade menu for improving the performance of the apparatus of the plant 10.

The upgrade menu includes components (hardware) and control logic (software) that improve the performance of the apparatus. Introducing the components of the upgrade menu improves the performance of the apparatus after the introduction, for example, the output efficiency of the gas turbine. When the control logic is introduced, the performance of the apparatus is improved when the control logic is operated, and the performance before the introduction is maintained when the control logic is not operated. That is, in the case of the control logic, the performance improvement effect can be enabled or disabled by software switching.

When introducing the upgrade menu, when the performance improvement effect is significant, the user can determine to introduce the upgrade menu without hesitation. However, when the effect is not significant, the user carefully evaluates the introduction effect to determine the introduction. On the other hand, in order to promote the introduction of the upgrade menu, the manufacturer provides the upgrade menu at a low cost (for example, free of charge) and makes an agreement such that the manufacturer can obtain the consideration from the user when a certain performance improvement effect is obtained. In such cases, it is necessary to accurately evaluate the effects of introduction. However, in reality, the performance may vary due to changes in the operating environment and operating conditions, the improvement in performance due to the upgrade menu may be hidden when external factors have a large influence on the performance, the performance improvement effect may not be checked due to the limit of measurement accuracy of data on performance, or, on the contrary, a higher performance improvement effect than expected may be obtained. For example, when payment for the consideration is determined once a year, based on the result of such performance evaluation, the result of the improvement effect evaluation that is performed once may be biased toward the user or the manufacturer, which is a high risk for both user and manufacturer. Therefore, in the present embodiment, the consideration calculation device 20 determines the consideration by a method that both the user and the manufacturer can easily understand, and reduces the risk of introducing the upgrade menu. In the first embodiment, the calculation of the consideration when a component upgrade menu having an improvement function is introduced will be described. The calculation of the consideration when the control logic is introduced will be described in the second embodiment.

The consideration calculation device 20 is communicably connected to the control device 11 via a network (NW). The consideration calculation device 20 acquires from the control device 11, the performance data of the apparatus included in the plant 10, the operation data indicating the state of the operating environment, or the like, and evaluates the performance difference (introduction effect) before and after the introduction of the upgrade menu. Then, the consideration calculation device 20 calculates a consideration commensurate with the performance improvement. The consideration calculation device 20 (1) provides as many opportunities for evaluating the introduction effect as possible, and (2) calculates the consideration according to the degree of the introduction effect indicated by the evaluation result each time. By (1), variations in evaluation results can be averaged, and it is possible to prevent profits from being biased to either the user or the manufacturer. By (2), it is possible to prevent the exchange of consideration that is not commensurate with the actual introduction effect. In addition, the exchange of consideration includes payment of consideration as a reward from the user to the manufacturer when the introduction effect is obtained by introducing the upgrade menu, and, on the contrary, payment of consideration as compensation for performance degradation from the manufacturer to the user when the introduction effect is not obtained and, for some reason, a negative effect is obtained.

The consideration calculation device 20 includes a performance data acquisition unit 21, an operation data acquisition unit 22, a control unit 23, a setting reception unit 24, an output unit 25, a storage unit 26, and a communication unit 27.

The performance data acquisition unit 21 acquires performance data including various performance values regarding the plant 10. The performance data acquisition unit 21 records the acquired performance data in the storage unit 26.

The operation data acquisition unit 22 acquires operation data including information on the operating environment (temperature, humidity, or the like) of the plant 10 and operating conditions (load magnitude, operating time, or the like). The operation data acquisition unit 22 records the acquired operation data in the storage unit 26.

The control unit 23 controls the process of calculating the consideration according to the magnitude of the effect of introducing the upgrade menu. For example, the control unit 23 calculates the consideration according to the introduction effect at a preset timing (monthly, daily, hourly, minutely, or the like). The control unit 23 includes an effect calculation unit 231, an external factor evaluation unit 232, and a consideration calculation unit 233.

The effect calculation unit 231 calculates the effect of introducing the upgrade menu. For example, the effect calculation unit 231 calculates a difference between the performance of the apparatus of the plant 10 (output power amount, power generation efficiency, reduction in emission of gas such as Nox) achieved when the upgrade menu is not introduced and the performance at the time of introduction, and calculates the introduction effect, based on the performance difference.

The external factor evaluation unit 232 removes, from the performance data, the influence of external factors such as the operating environment and the operating conditions. For example, the performance achieved in a high-temperature environment is affected also from the temperature in addition to the effect of introducing the upgrade menu. When this performance can be compared with the performance before introduction, which is achieved at the same temperature, the effect of introducing the upgrade menu can be calculated, but the introduction effect can be calculated more accurately when the influence of temperature is removed from the performance data before and after the introduction and the performance difference is calculated by using the performance data after the removal. Especially when the influence of a temperature difference on the performance is larger than the introduction effect, the introduction effect may not be checked due to the influence of temperature (for example, in a condition that the temperature after introduction adversely affects the performance, the introduction effect is hidden by the influence of temperature). The external factor evaluation unit 232 removes influences such as environmental factors from the performance data in order to extract an accurate introduction effect.

The consideration calculation unit 233 calculates the consideration exchanged between the provider (manufacturer) and the recipient (user) of the upgrade menu, based on the introduction effect calculated by the effect calculation unit 231. For example, when the introduction effect is positive, the consideration paid by the user to the manufacturer is calculated. In this case, the larger the introduction effect is, the larger the calculated consideration is. On the other hand, when the introduction effect is negative, the consideration paid by the manufacturer to the user may be calculated according to the initial cost for introducing the upgrade menu or the like. For example, in a case where the initial cost is 0, even when the introduction effect is 0 or negative, the consideration may not be calculated. On the contrary, in a case where the user is requested to pay the initial cost, when the introduction effect is 0 or negative, the consideration commensurate with the initial cost is calculated. A guaranteed value f or performance improvement, which is a standard for payment of consideration, may be set, and the consideration may be calculated according to the degree of exceeding (or falling below) the guaranteed value.

The setting reception unit 24 receives the setting of information necessary for calculating the consideration. For example, the setting reception unit 24 receives the setting of the timing (for example, every hour) for calculating the introduction effect and the consideration, the setting of the consideration calculation table in which the consideration is determined according to the degree of the introduction effect, and the like.

The output unit 25 outputs the consideration calculated by the consideration calculation unit 233.

The storage unit 26 stores the performance data, the operation data, and the setting information received by the setting reception unit 24. The storage unit 26 stores the representative value of the performance data before the upgrade menu is introduced.

The communication unit 27 performs data communication with the control device 11. Since the performance data can be acquired from the plant 10 in real time by the communication unit 27, the consideration calculation device 20 appropriately calculates the effect of introducing the upgrade menu in the current plant 10, or calculates the consideration according to the introduction effect, based on the latest performance data.

Figure 2:
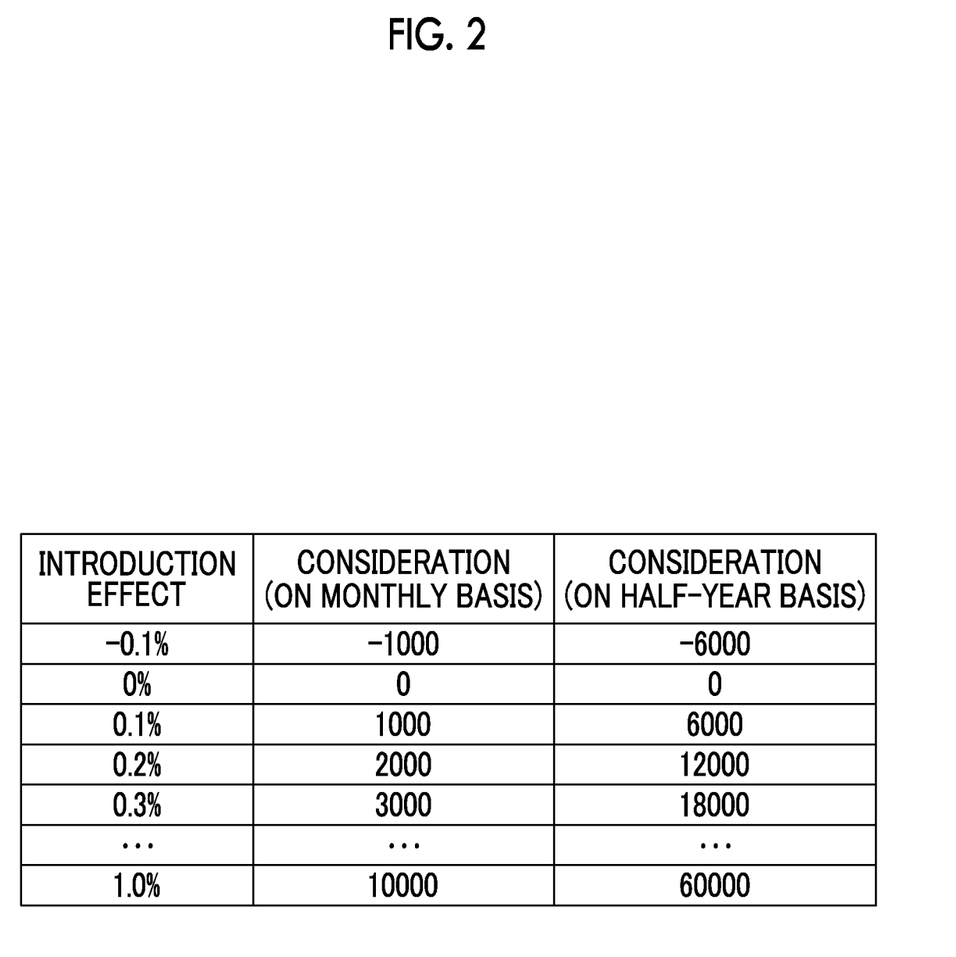
FIG. 2 is a diagram illustrating an example of a consideration calculation table in the first embodiment of the present invention.

FIG. 2 is a diagram illustrating an example of a consideration calculation table in the first embodiment of the present invention.

In the consideration calculation table, the consideration is set according to the introduction effect. For example, when the consideration is calculated monthly, the consideration calculation unit 233 reads the value in the "consideration (on a monthly basis)" column of the row corresponding to the introduction effect, from the consideration calculation table, and uses this value as the consideration. For example, when the consideration is calculated every half a year, the consideration calculation unit 233 reads the value in the "consideration (on half a year basis)" column of the row corresponding to the introduction effect, from the consideration calculation table, and uses this value as the consideration. Next, an example of calculating the consideration will be described.

(Monthly Introduction Effect and Consideration Calculation)

Figure 3:
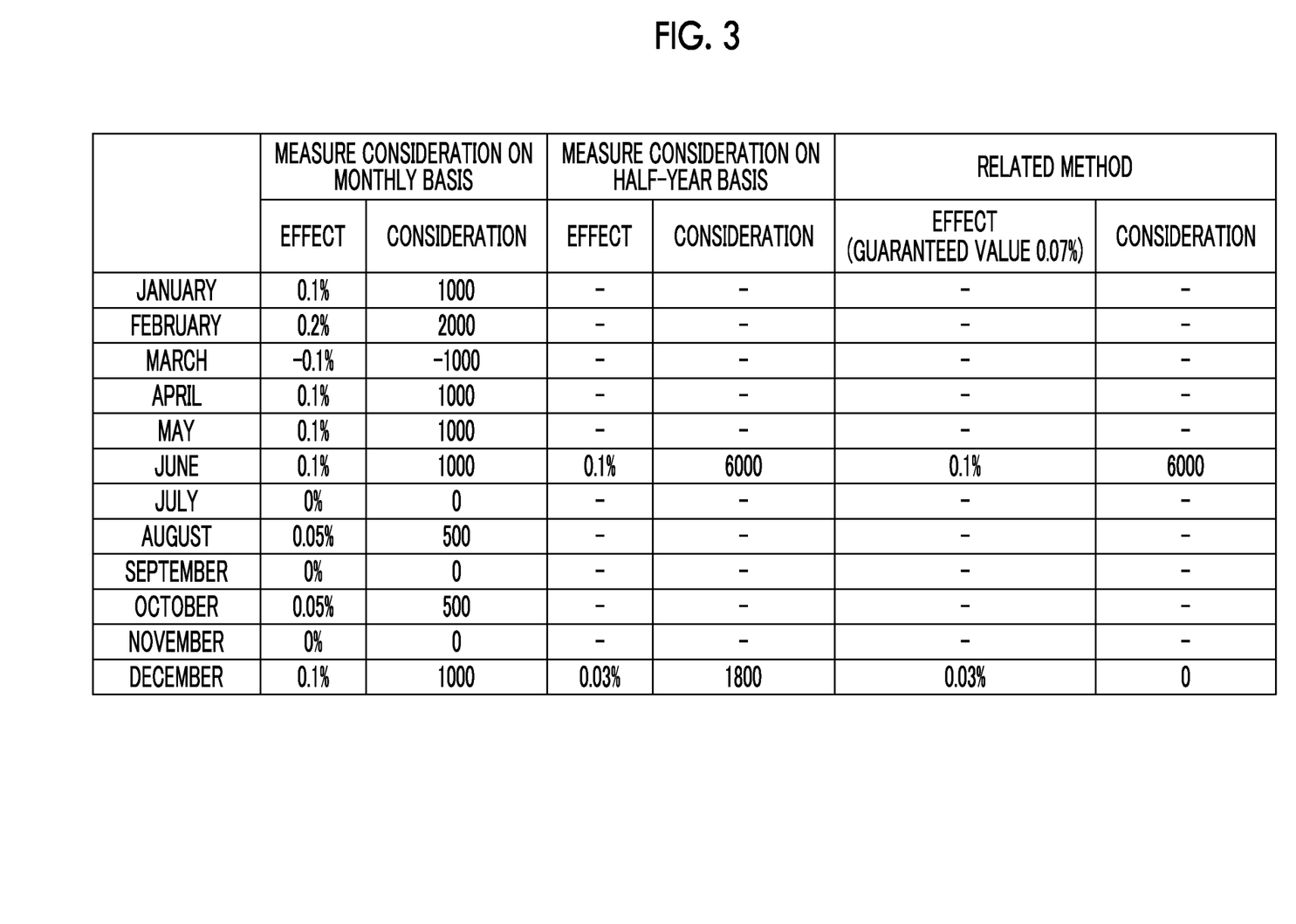
FIG. 3 is a diagram illustrating a calculation example of an introduction effect and consideration in the first embodiment of the present invention.

FIG. 3 is a diagram illustrating a calculation example of the introduction effect and consideration in the first embodiment of the present invention.

First, the case of evaluating the introduction effect on a monthly basis will be described. It is assumed that the upgrade menu (components) has been introduced in the plant 10.

The effect calculation unit 231 reads the performance data (for example, the output efficiency of the gas turbine) acquired in January, stored in the storage unit 26, at the end of January. The effect calculation unit 231 calculates the representative value of the January output efficiency, for example, by calculating the average value of the output efficiency for January. The effect calculation unit 231 reads and acquires the representative value of the output efficiency before the upgrade menu is introduced, stored in the storage unit 26. The effect calculation unit 231 calculates the introduction effect "0.1" by subtracting the representative value of the output efficiency before the introduction from the output efficiency for January. Next, the consideration calculation unit 233 calculates the consideration for January, based on the January introduction effect "0.1" and the consideration calculation table illustrated in FIG. 2. Specifically, in the consideration calculation table in FIG. 2, the value "1000" in the "consideration (on a monthly basis)" column of the row where the value in the "introduction effect" column is "0.1" is acquired, and the value "1000" is calculated as the consideration for January. For example, when the introduction effect is a value such as "0.05%" that is not set in the table, the consideration calculation unit 233 may calculate the consideration "500" at that time from the set value in the consideration calculation table by interpolation calculation (August and October). Similarly, the effect calculation unit 231 calculates the introduction effect in and after February, and the consideration calculation unit 233 calculates the consideration after February.

For example, in January, a performance improvement of "0.1%" is obtained, so that the consideration "1000" is paid from the user to the manufacturer. In February, the performance improvement of "0.2%" is obtained, so that the manufacturer obtains the consideration "2000" from the user. In this way, the consideration can be obtained according to the degree of performance improvement, so that the manufacturer can provide, for example, an upgrade menu at a low cost, and can obtain a profit according to the performance improvement effect after the introduction. The user can introduce the upgrade menu at a low cost and may pay consideration only for the amount that the effect is actually obtained, so the risk of introduction is reduced, and it is possible to obtain the profit such as the fuel cost reduction due to the increase in output efficiency due to the performance improvement effect.

On the contrary, in March, the performance decreases by "0.1%" (−0.1). The consideration "−1000" at this time means that the consideration "1000" is paid from the manufacturer to the user. When the performance decreases, the user can be compensated for the consideration of the decrease by the manufacturer, so that the user can safely introduce the upgrade menu. Such compensation eliminates the need for the manufacturer to present the guaranteed value of the introduction effect, and the manufacturer is free from the risk when the guaranteed value cannot be achieved. In particular, even in the upgrade menu, which has a small introduction effect and in which it is difficult to set a guaranteed value, it is possible to make a proposal to the user with confidence without setting a guaranteed value.

In July, the degree of improvement in performance is 0%, so no consideration is exchanged between the user and the manufacturer. The introduction effect may not be checked due to various factors during the operation of the plant, but when such an agreement can be made, the manufacturer may not pay compensation consideration even when the introduction effect cannot be checked, so countermeasures concerning compensation risk when the introduction effect cannot be measured may not be performed. As in the introduction effect and consideration calculation process of the present embodiment, when the condition is such that the consideration is determined according to the actually obtained introduction effect, and there are as many opportunities for introduction effect and consideration calculation as possible, both the user and the manufacturer can be convinced and can agree on such an agreement, with the expectation that an appropriate consideration will be obtained at other opportunities.

(Introduction Effect and Consideration Calculation Every Half a Year)

Next, the case where the frequency of calculation of the introduction effect and the consideration is decreased every half a year will be described.

The effect calculation unit 231 reads the performance data (output efficiency) acquired from January to June, stored in the storage unit 26, at the end of June. The effect calculation unit 231 calculates the average value of the output efficiency for half a year and sets it as the representative value of the output efficiency after the introduction. The effect calculation unit 231 subtracts the representative value of the output efficiency before introduction, stored in the storage unit 26, from the representative value of the output efficiency for half a year, and calculates the introduction effect "0.1%". Next, the consideration calculation unit 233 calculates the consideration "1000" corresponding to the performance improvement for half a year, based on the introduction effect "0.1%" and the consideration calculation table. For July to December, similarly, the effect calculation unit 231 calculates the introduction effect "0.03%", and the consideration calculation unit 233 calculates the consideration "1800".

When the consideration calculated every half a year is compared with the case of monthly consideration calculation, the consideration "6000" in June is equal to the total of considerations from January to June, which are monthly calculated. However, in reality, the introduction effect of 0.2% is obtained in February, and the introduction effect of "0.1%" decreases in March. By calculating the consideration monthly, it is possible to recognize the fluctuation of these performances. Each time, consideration commensurate with the fluctuation is exchanged, so transparency regarding the relationship between the introduction effect and consideration exchange is secured. By repeating a large number of evaluations of the effects, bias in evaluation results is suppressed, and fairness is secured for both users and manufacturers.

Next, July to December will be considered. When the consideration is calculated every half a year, the consideration in December is "1800", and when calculated monthly, the total consideration from July to December is "2000". When there are variations in the monthly introduction effects during half a year, the variations are averaged in the evaluation performed once every half a year, so it is considered that there is a difference from the case where the consideration for the change at each month is calculated and the considerations are summed up. By calculating the consideration at intervals such that the introduction effect is not averaged, both the manufacturer and the user can have an opportunity to clearly check the effect of introducing the upgrade menu. In particular, in the case of an upgrade menu in which the introduction effect tends to vary, the manufacturer can reliably obtain a profit by calculating the consideration every short period.

(Consideration Calculation in the Related Art)

The consideration calculation in the related art will be described for comparison. As an example, it is assumed that the consideration is calculated once every half a year. In the method in the related art, a guaranteed value is determined, and when the improvement in performance reaches this guaranteed value, the user pays a consideration to the manufacturer, and when the improvement does not reach this guaranteed value, the user does not pay the consideration to the manufacturer. Depending on the contract, the manufacturer pays a penalty consideration to the user. In the example of FIG. 3, the guaranteed value is set to "0.07%" and the efficiency improvement of "0.1%" is achieved in June, so the user pays a predetermined consideration "6000" to the manufacturer. In the case of December, the efficiency improvement of "0.03%" has not reached the guaranteed value, and therefore the user does not pay a consideration to the manufacturer.

Thus, in the consideration calculation in the related art, the consideration according to the magnitude of the introduction effect is not calculated. Further, when the guaranteed value is not achieved, the manufacturer cannot make a profit even when the efficiency increases. Therefore, it is important for a manufacturer to set a guaranteed value that can secure profits, and even when an effect improvement of, for example, "0.1%" is expected through a desktop calculation, a low guaranteed value (0.07%) is set expecting a variation in performance. Then, the user needs to pay the consideration for the smaller performance improvement, which may not be profitable.

On the other hand, according to the introduction effect and the consideration calculation method of the present embodiment, for example, by offering the upgrade menus free of charge, instead of not presenting guaranteed values, a manufacturer can obtain a profit commensurate with even a slight efficiency improvement. Since the user does not have to pay the consideration when there is no effect, there is no need to invest in introducing an upgrade menu that does not guarantee the effect. By providing many opportunities to evaluate the introduction effect, for example, such as the calculation of the consideration for each month, without being greatly affected by the result of one-time evaluation, the user can enjoy the profits of improving the performance of the plant 10 by introducing the upgrade menu, and the manufacturer can obtain consideration for performance improvement.

Figure 4:
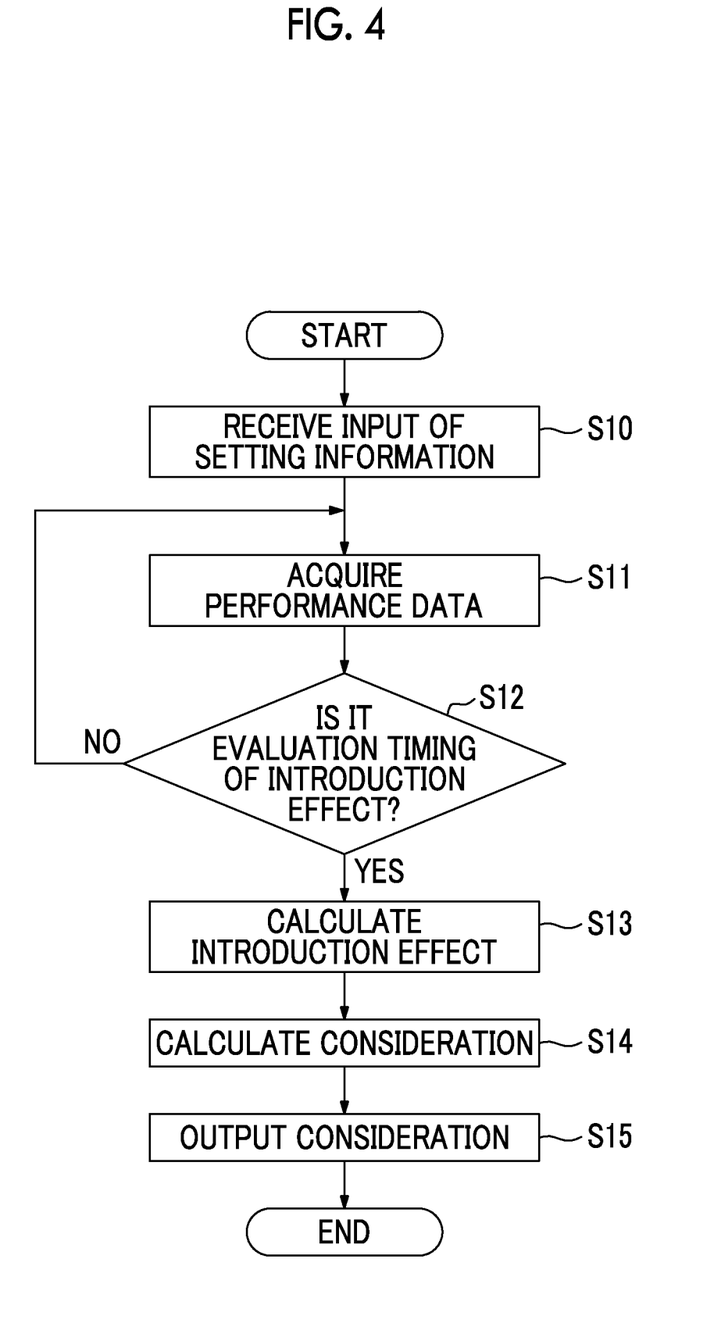
FIG. 4 is a first flowchart illustrating an example of an introduction effect calculation process and a consideration calculation process in the first embodiment of the present invention.

FIG. 4 is a first flowchart illustrating an example of the introduction effect calculation process and the consideration calculation process in the first embodiment of the present invention. The flow of the introduction effect calculation process and the consideration calculation process will be described with reference to FIG. 4.

It is assumed that the upgrade menu (components) has been introduced. First, the setting reception unit 24 receives an input of setting information necessary for the consideration calculation process (step S10). For example, the setting reception unit 24 receives an input of a consideration calculation table that is set such that both the manufacturer and the user can secure profit. The setting reception unit 24 receives settings for appropriate timing for performing the consideration calculation process. Considering management convenience for consideration exchange and the ease of comparison before and after introducing the upgrade menu, the timing may be set such that using the cycle in which the operating state changes as one segment, the consideration based on the introduction effect obtained during that interval is calculated. For example, when the gas turbine is started and stopped daily, the timing may be set such that the introduction effect is evaluated and the consideration is calculated on a daily basis. Alternatively, when the load required for the plant 10 changes on a half-day basis, the timing may be set such that the introduction effect is evaluated and the consideration is calculated every half day. Similarly, when the load or the operation mode of the gas turbine changes on a weekly basis, the timing may be set such that the consideration is calculated on a weekly basis. Alternatively, when a gas turbine operates at a constant load all year long, in order to increase evaluation opportunities and eliminate bias, for example, it may be set to evaluate the introduction effect and calculate the consideration in units as small as possible, such as every hour or every minute. Alternatively, depending on the nature of the upgrade menu, when the introduction effect cannot be measured unless the plant 10 is operated for a certain period, the consideration calculation timing may be set according to the period. The timing of evaluating the introduction effect and calculating the consideration is not limited to a regular interval of time, such as a day unit or an hour unit. For example, a time from the start-up of the gas turbine to the stop once may be set as a unit of one evaluation period. Alternatively, when the gas turbine repeats operation at the rated load and 50% partial load, with the period of operation at rated load as one evaluation period and the period of operation at partial load as one evaluation period, the consideration may be calculated each time the load band changes.

In step S10, the representative value of the performance measured when the plant 10 is operated under the same operating environment and operating conditions as the evaluation target before the upgrade menu is introduced is set. The setting reception unit 24 records various types of setting information in the storage unit 26.

Next, the performance data acquisition unit 21 periodically acquires performance data during operation of the plant 10 (step S11). Next, the control unit 23 determines whether it is the evaluation timing of the introduction effect (step S12). For example, when it is set to calculate the consideration on a daily basis in step S10, the control unit 23 determines that it is the evaluation timing of the introduction effect when 24 hours have elapsed from the previous calculation of the consideration. When it is not the evaluation timing (step S12; No), the control unit 23 waits until the evaluation timing arrives.

When it is determined that the evaluation timing has been reached (step S12; Yes), the control unit 23 calculates the introduction effect, and the consideration according to the introduction effect. First, the effect calculation unit 231 calculates the introduction effect (step S13). For example, the effect calculation unit 231 reads from the storage unit 26, the performance data acquired after the previous evaluation, and calculates the average value. The effect calculation unit 231 subtracts the performance data before the upgrade menu introduction, stored in the storage unit 26, from the calculated average value, and calculates the degree of improvement (effect) in performance. Next, the consideration calculation unit 233 calculates the consideration commensurate with the introduction effect, based on the effect calculated in step S13 and the consideration calculation table (step S14). Next, the output unit 25 outputs the consideration calculated in step S14. The manufacturer and the user exchange the output consideration.

As described with reference to FIG. 4, in the consideration calculation method in the related art, only once in a predetermined period (for example, one year), the effect of introducing the upgrade menu is calculated, and the consideration is determined based on whether the introduction effect exceeds the guaranteed value. The consideration calculation device 20 of the present embodiment (1) calculates the effect of introducing the upgrade menu at each of a plurality of time points (for example, every month or every day) in a predetermined period (for example, one year), and (2) consideration is calculated according to the magnitude of the introduction effect at each of the plurality of time points. This can reduce the risk of both the user and the manufacturer in introducing the upgrade menu.

Next, a process of removing the influence of external factors from the performance data will be described. In the description of FIG. 4, the performance data pieces measured under the same operating environment before and after the introduction of the upgrade menu are compared. However, when the influence of the operating environment on the performance is greater than the influence of the upgrade menu on the performance, unless the influence of external factors is removed from the performance data, the performance comparison before and after the upgrade menu is introduced may not be accurate.

Figure 5:
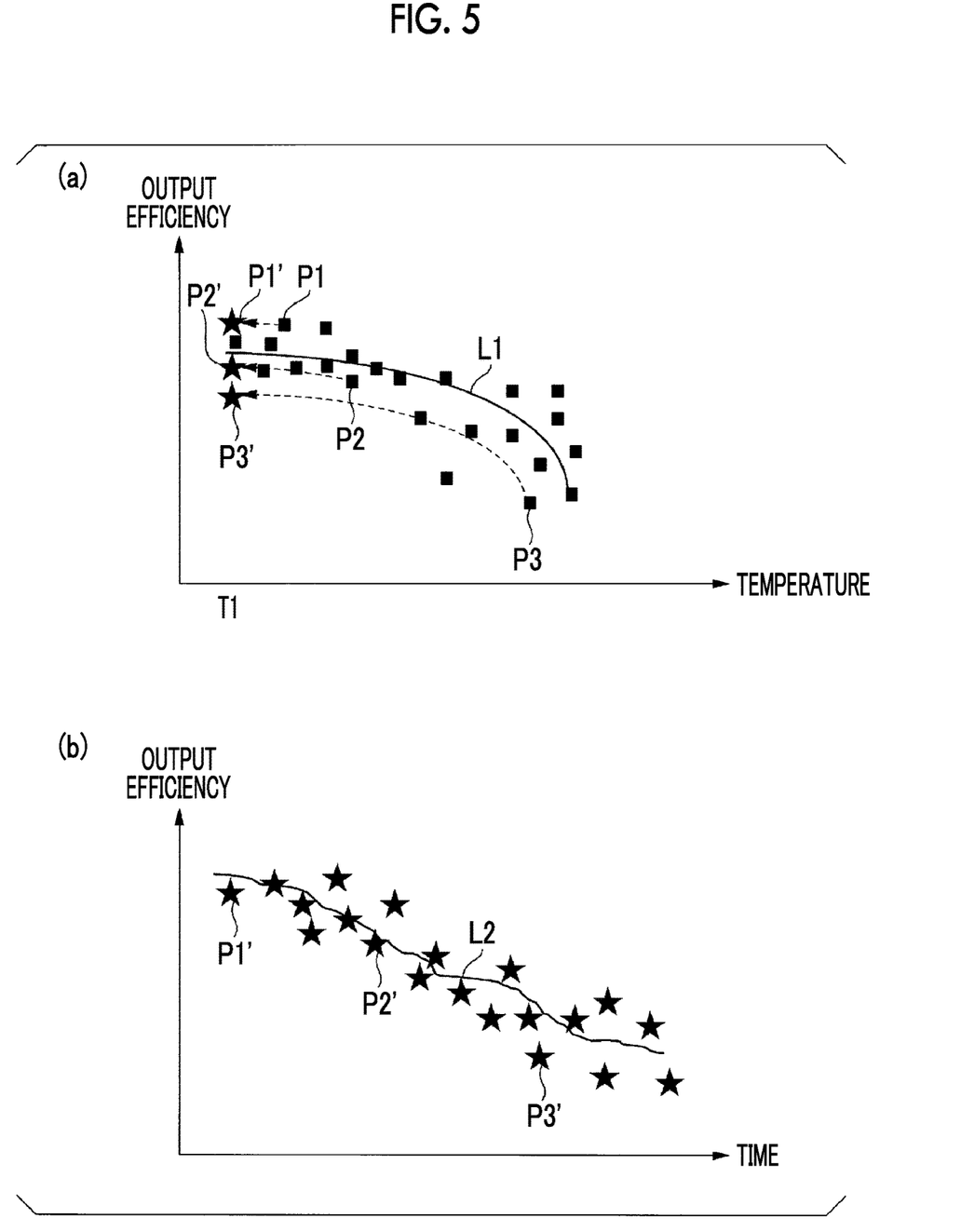
FIG. 5 is a diagram illustrating an environmental factor removal process according to the first embodiment of the present invention.

FIG. 5 is a diagram illustrating an environmental factor removal process according to the first embodiment of the present invention.

The external factor evaluation unit 232 generates a function indicating the relationship between the performance data and the operation data when the performance indicated by the performance data is achieved. FIG. 5A is a graph illustrating the relationship between the output efficiency (vertical axis) of the gas turbine and the temperature (horizontal axis) of the air taken in by the gas turbine (compressor). In FIG. 5A, square dots plot the relationship between the temperature included in the operation data acquired at different times and the output efficiency of the gas turbine included in the performance data. A curve L1 indicates a function generated by the external factor evaluation unit 232 from the square dots by single regression analysis or the like. In addition, when there are a plurality of external factors, a function can be generated by multiple regression analysis. Generally, a gas turbine can be operated with higher efficiency as the temperature is lower, and the output efficiency decreases as the temperature rises. The curve L1 includes such a relationship between the temperature and the output efficiency of the gas turbine, and does not necessarily indicate the performance of the gas turbine alone. For example, comparing points P1 and P3, the output efficiency is higher at the point P1. However, the performance of the gas turbine at the point P1 is not always higher than the performance of the gas turbine at the point P3. For example, the output efficiency of the gas turbine at the point P1 is deteriorated compared to the output efficiency at the point P3, but the output efficiency at the point P1 may be higher because the operating environment is good (the temperature is low). The external factor evaluation unit 232 performs a process of removing the influence of the external factor (temperature). For example, using the temperature T1 as a reference value, the output efficiency calculated under various temperatures is converted into the output efficiency under the temperature T1. In this case, the external factor evaluation unit 232 moves each of all the square dots along the curve L1 such that the temperature value corresponding to each point becomes T1. For example, in the case of the point P1, the point P1 is moved as indicated by a dashed arrow. As a result, the point P1 moves to the star point P1'. The value of the output efficiency at the point P1' is the output efficiency after removal of the influence of the temperature. Similarly, the points P2 and P3 are moved to the start points P2' and P3' according to the broken line arrows extending from the respective points along the curve L1. The value of the output efficiency at the point P2' after the move is the output efficiency after removal of the external factor at the point P2. The value of the output efficiency at the point P3' after the move is the output efficiency after removal of the external factor at the point P3. By matching the output efficiencies under the same temperature, it becomes possible to compare the output efficiencies without being affected by the temperature. This is called an external factor removal process.

FIG. 5B is a graph illustrating the relationship between the output efficiency (vertical axis) and the time (horizontal axis) when the output efficiency is obtained. The graph of FIG. 5B is obtained by re-plotting the output efficiency at each time point after the external factor removal process, obtained by the above process, on a graph representing the relationship between the time when the output efficiency is achieved and the output efficiency. The curve L2 is an approximate curve generated by the external factor evaluation unit 232 from the star dots by regression analysis or the like. The curve L2 indicates that the output efficiency gradually decreases as time passes. That is, the curve L2 indicates that the output efficiency of the gas turbine deteriorates with the passage of time regardless of the fluctuation of temperature during this period.

As described above, the external factor removal process enables the evaluation of the performance of the plant 10 itself which is not affected by the environmental factor and the like. For example, by calculating the change over time in the output efficiency as illustrated in FIG. 5B, it is possible to obtain the change over time in performance.

The external factor evaluation unit 232 performs a process of removing the influence of the external factor from each of the performance data before the upgrade menu is introduced and the performance data after the upgrade menu is applied.

Figure 6:
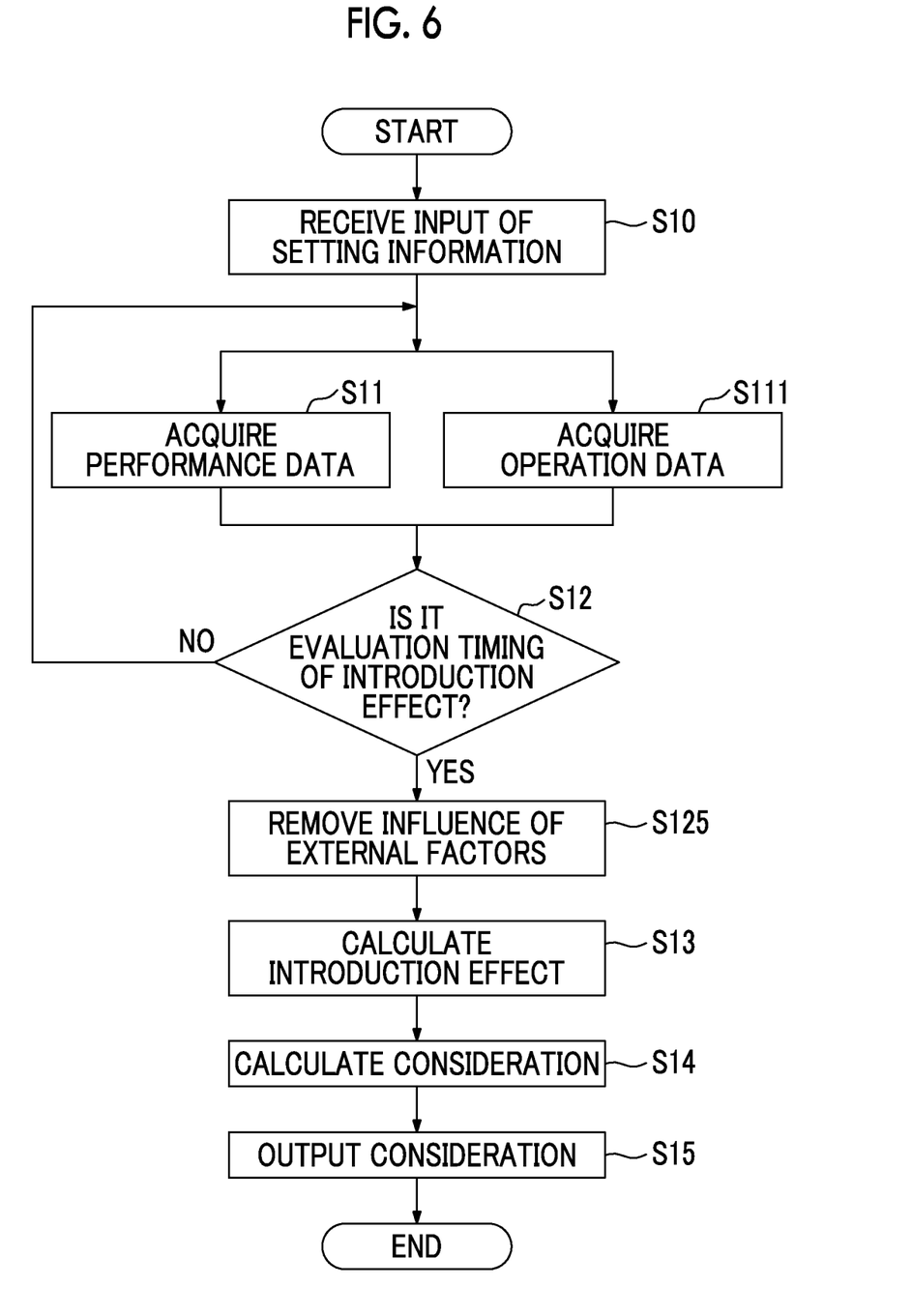
FIG. 6 is a second flowchart illustrating an example of an introduction effect calculation process and a consideration calculation process in the first embodiment of the present invention.

FIG. 6 is a second flowchart illustrating an example of the introduction effect calculation process and the consideration calculation process in the first embodiment of the present invention. The flow of the introduction effect calculation process and the consideration calculation process when the external factor removal process is performed will be described with reference to FIG. 6. The process similar to that of FIG. 4 will be briefly described. In the storage unit 26, performance data before the upgrade menu is introduced and operation data when the performance indicated by the performance data is achieved are recorded.

First, the setting reception unit 24 receives an input of setting information necessary for the introduction effect and consideration calculation process (step S10). Next, the performance data acquisition unit 21 periodically acquires performance data (step S11). In parallel with this, the operation data acquisition unit 22 periodically acquires operation data (step S111). The performance data and the operation data include time information, and the performance information includes, for example, the output efficiency of the gas turbine and the time when the output efficiency is achieved. The operation data includes information on temperature, humidity, load, and the like, as well as information on the time at which the temperature, humidity, and load are measured.

Next, the control unit 23 determines whether it is the evaluation timing of the introduction effect (step S12). When it is determined that the evaluation timing has been reached (step S12; Yes), the control unit 23 performs an external factor removal process, and a process of calculating the evaluation of the introduction effect and a consideration according to the introduction effect.

First, the external factor evaluation unit 232 performs a process of removing the influence of external factors, from each of the performance data after the upgrade menu is introduced and the performance data before the upgrade menu is introduced (step S125). In case of performance data after introducing the upgrade menu, the external factor evaluation unit 232 associates performance data and operation data in an evaluation target period (for example, when evaluating the introduction effect and calculating the consideration on a daily basis, a period from 24 hours ago to the present) with each other based on time information, and generates, for example, a function indicating the relationship between each value such as the temperature, humidity, and load of the operation data and the output efficiency achieved at the same time by multiple regression analysis or the like. Then, the external factor evaluation unit 232 removes the external factors by aligning the value of each of parameters such as the temperature, humidity, and load to the predetermined reference value determined for each parameter, as described in FIG. 5. Similarly, the external factor evaluation unit 232 uses the performance data and the operation data before the upgrade menu is introduced to perform the external factor removal process of aligning the value of each parameter of the external factor to the same reference value as after the introduction.

The external factor evaluation unit 232 records, in the storage unit 26, data obtained by removing the influence of external factors from the performance data before and after the upgrade menu is introduced.

Next, the effect calculation unit 231 calculates the introduction effect, by using the performance data after removing the influence of external factors (step S13). Then, the consideration calculation unit 233 calculates the consideration (step S14), and the output unit 25 outputs the calculated consideration. By removing the influence of external factors, the effect of introducing the upgrade menu can be calculated more accurately. The consideration can be calculated based on the accurate introduction effect.

Second Embodiment

Hereinafter, the introduction effect calculation process and the consideration calculation method according to a second embodiment of the present invention will be described with reference to FIG. 7.

Figure 7:
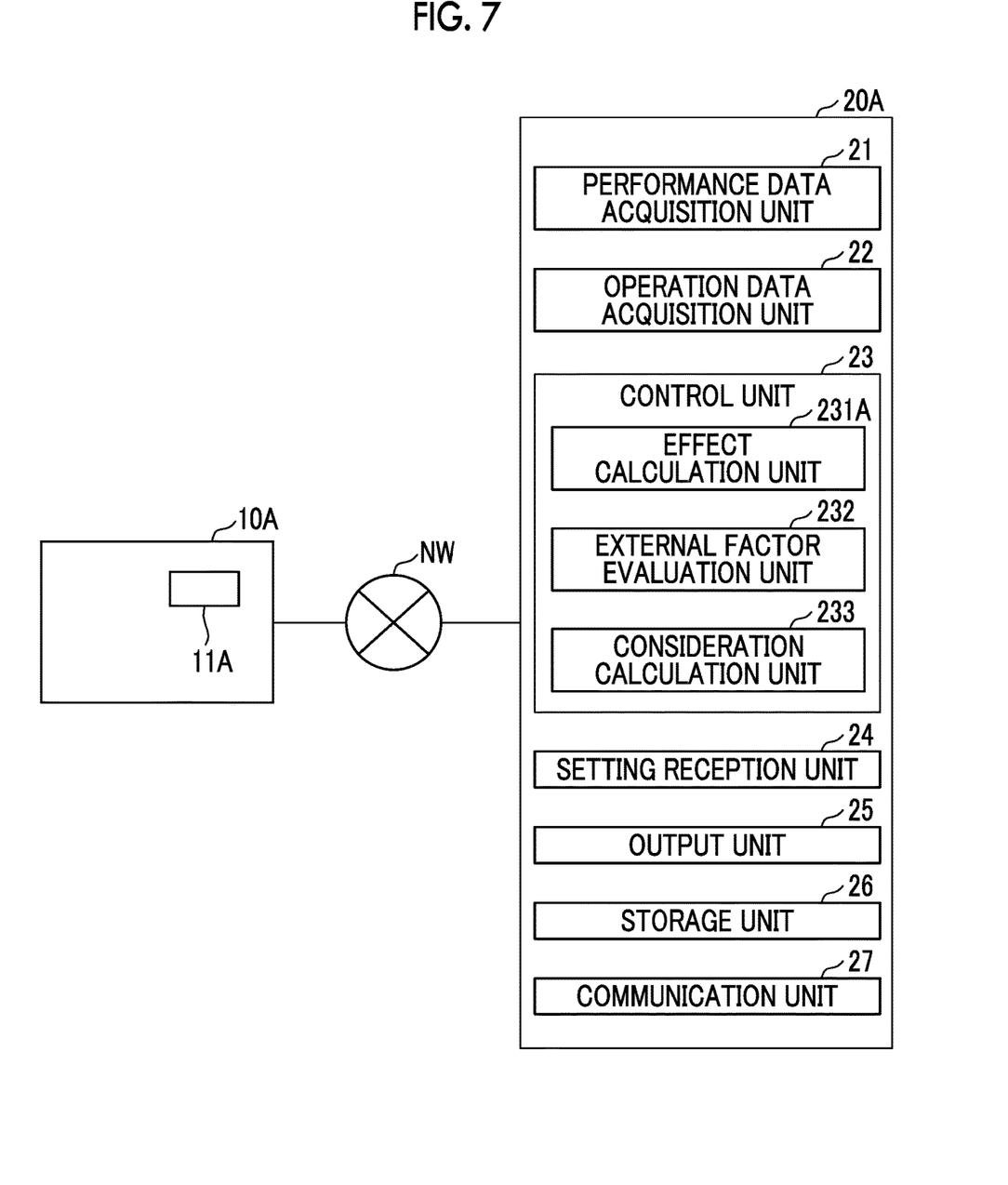
FIG. 7 is a block diagram of a plant and a consideration calculation device according to a second embodiment of the present invention.

FIG. 7 is a block diagram of a plant and a consideration calculation device according to the second embodiment of the present invention.

Of the configurations according to the second embodiment of the present invention, the same configurations as the configurations according to the first embodiment of the present invention are denoted by the same reference numerals, and description will be omitted. A control logic upgrade menu is introduced to a plant 10A according to the second embodiment (referred to as control logic a). For example, the control logic a is incorporated in the control program executed by the control device 11A, and execution or non-execution of the control logic a is switched according to a user's instruction or the like. The control device 11A transmits the performance data and the operation data to the consideration calculation device 20A. The performance data includes, for example, flag information indicating whether or not the control logic a is being executed (for example, ON when being executed, OFF when not being executed), in addition to the output efficiency and time.

In the consideration calculation device 20A, the performance data acquisition unit 21 acquires performance data including flag information and records the acquired performance data in the storage unit 26. The control unit 23 includes an effect calculation unit 231A instead of the effect calculation unit 231. The effect calculation unit 231A distinguishes between the performance when the upgrade menu is introduced (when the control logic a is executed) and the performance when the upgrade menu is not introduced (when the control logic a is not executed), by using the flag information included in the performance data and comparing the two performances to calculate the effect. When the control logic a switches from the non-execution state to the execution state, the effect calculation unit 231A may compare the performance in the execution state with the performance in the immediately previous non-execution state or the performance in the immediately subsequent non-execution state. By comparing the performance with the performance in the immediately previous non-execution time, it is possible to compare performances measured in a similar operating environment, with the same deterioration over time of the plant 10A.

Next, the flow of the introduction effect calculation process and the consideration calculation process of the second embodiment will be described with reference to FIG. 4 described in the first embodiment.

First, the setting reception unit 24 receives an input of setting information necessary for the introduction effect and consideration calculation process (step S10). Similar to the first embodiment, the consideration calculation table and the settings for the timing for performing the introduction effect and consideration calculation process are received. The timing of the consideration calculation process may be set as in the first embodiment (for example, a day unit), or may be set such that the consideration is calculated at a timing at which execution and non-execution of the control logic a are switched.

Next, the control unit 23 determines whether it is the evaluation timing of the introduction effect (step S12). When it is determined that the evaluation timing has been reached (step S12; Yes), the effect calculation unit 231A first calculates the introduction effect (step S13). For example, in the case of setting to calculate the introduction effect on a daily basis, the effect calculation unit 231A acquires separately from the storage unit 26, the performance data when the control logic a is executed and the performance data when the control logic a is not executed, out of the performance data acquired within 24 hours. Then, the effect calculation unit 231A calculates the representative value of the performance when the control logic a is executed and the representative value of the performance when the control logic a is not executed. Next, the effect calculation unit 231A calculates a difference (effect) between the performance when the control logic a is executed and the performance when the control logic a is not executed.

For example, in the case of setting in which the introduction effect is calculated at a timing at which execution and non-execution are switched, the effect calculation unit 231A calculates the effect by comparing the representative value of the performance at the time of execution with the representative value of the performance at the time of non-execution immediately before the execution time, at the timing when the control logic a switches from execution to non-execution. Alternatively, at the timing when the control logic a switches from execution to non-execution, the effect may be calculated by comparing the representative value of the performance at the time of execution with the representative value of the performance at the time of non-execution immediately after the execution time (for example, in the current non-execution state, the average value of the performance up to the present after the switching to the non-execution state).

Next, the consideration calculation unit 233 calculates the consideration (step S14), and the output unit 25 outputs the calculated consideration.

In the present embodiment, the external factor evaluation unit 232 may perform the external factor removal process. For example, this is effective when changes in environmental factors cannot be ignored, such as when the effect of the control logic a is smaller than the effect of the external factors on the performance, or when there is no switching between the execution and non-execution of the control logic a and the plant is operated at the execution state.

Figure 8:
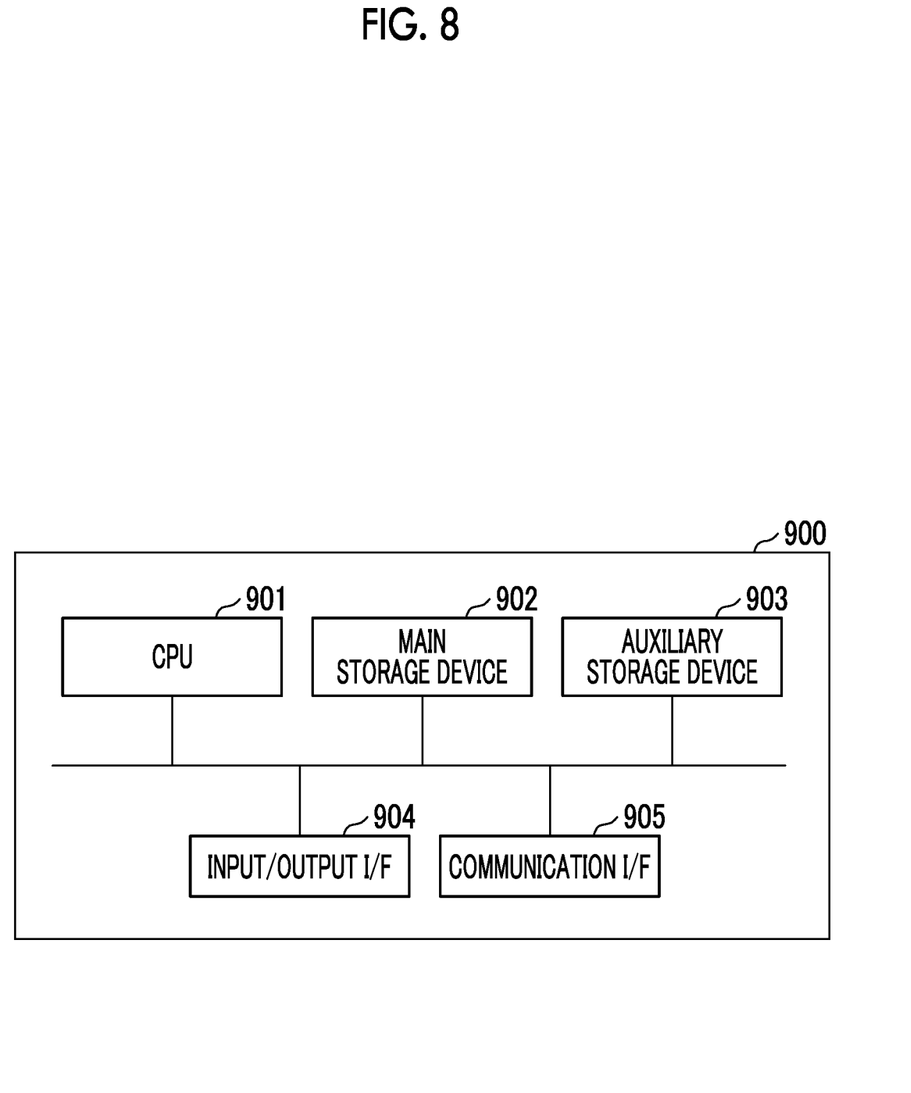
FIG. 8 is a diagram illustrating an example of a hardware configuration of a consideration calculation device in each embodiment of the present invention.

FIG. 8 is a diagram illustrating an example of the hardware configuration of the consideration calculation device according to each embodiment of the present invention.

The computer 900 is, for example, a personal computer (PC) or a server terminal device that includes a CPU 901, a main storage device 902, an auxiliary storage device 903, an input/output interface 904, and a communication interface 905. The above-described consideration calculation device 20 is mounted on the computer 900. The operation of each processing unit described above is stored in the auxiliary storage device 903 in the form of a program. The CPU 901 reads the program from the auxiliary storage device 903, develops the program into the main storage device 902, and executes the above process according to the program. Further, the CPU 901 secures a storage area corresponding to the storage unit 26 in the main storage device 902 according to the program. The CPU 901 secures a storage area for storing data under processing in the auxiliary storage device 903 in accordance with the program.

In at least one embodiment, the auxiliary storage device 903 is an example of a non-transitory tangible medium. Other examples of non-transitory tangible mediums include magnetic disks, magneto-optical disks, CD-ROMs, DVD-ROMs, semiconductor memories, and the like, connected through the input/output interface 904. Further, when this program is delivered to the computer 900 through a communication line, the computer 900 receiving the delivered program may develop the program in the main storage device 902 and execute the above process. Further, the program may be for realizing a part of the above-described functions. Further, the program may be a so-called differential file (differential program) which realizes the above-described functions in combination with other programs already stored in the auxiliary storage device 903.

In addition, it is possible to appropriately replace the components in the above-described embodiments with known components without departing from the spirit of the present invention. It should be noted that the technical scope of the present invention is not limited to the above-described embodiments, and various modifications can be made without departing from the spirit of the present invention.

The upgrade menu is an example of the improvement function. The consideration calculation device 20 is an example of an upgrade evaluation device. The introduction effect and consideration calculation process illustrated in FIGS. 4 and 6 are examples of the upgrade evaluation method.

INDUSTRIAL APPLICABILITY

According to the above-described upgrade evaluation method and upgrade evaluation device, by appropriately calculating the consideration for the effect of introducing an upgrade menu, it is possible to reduce the risk for both the user and the manufacturer when introducing the upgrade menu.

REFERENCE SIGNS LIST

10 Plant
11 Control device
20 Consideration calculation device
21 Performance data acquisition unit
22 Operation data acquisition unit
23 Control unit
24 Setting reception unit
25 Output unit
26 Storage unit
27 Communication unit
23 Control unit
231 Effect calculation unit
232 External factor evaluation unit
233 Consideration calculation unit
900 Computer
901 CPU
902 Main storage device
903 Auxiliary storage device
904 Input/output interface
905 Communication interface

The invention claimed is:

1. An upgrade evaluation method executed by a computer, the method comprising:
a communication step of performing data communication with a control device which controls a gas turbine included in a plant;
a performance data acquisition step of acquiring performance data of the gas turbine via the communication step, the performance data including at least an output efficiency of the gas turbine;
an effect calculation step of calculating, based on the performance data, an introduction effect based on a difference in performance between when an improvement function of improving the performance of the as turbine is introduced and when the improvement function is not introduced;

a consideration calculation step of determining a size of a consideration for the introduction effect according to a degree of the introduction effect, wherein the consideration is exchanged between a provider and a recipient of the improvement function; and an operating state change determination step of determining a physical change in an operating state of the gas turbine, wherein the effect calculation step and the consideration calculation step are executed at a time period, the time period being determined according to the physical change in the operating state of the gas turbine, to calculate the introduction effect when the time period has elapsed since a previous calculation of the introduction effect, and to calculate the consideration based on the introduction effect each time the introduction effect is calculated.

2. The upgrade evaluation method according to claim 1, wherein, in the effect calculation step, the performance when the improvement function is not introduced is set as a standard, and the introduction effect is calculated to be positive if the performance when the improvement function is introduced exceeds the standard, and the introduction effect is calculated to be negative if the performance when the improvement function is introduced falls below the standard.

3. The upgrade evaluation method according to claim 2, wherein in the consideration calculation step, when the introduction effect is positive, the consideration to be paid from the recipient to the provider is calculated.

4. The upgrade evaluation method according to claim 2, wherein in the consideration calculation step, when the introduction effect is negative, the consideration to be paid from the provider to the recipient is calculated.

5. The upgrade evaluation method according to claim 1, further comprising:

an external factor evaluation step of removing, from the performance data, an influence of an operating environment and an operating condition of the gas turbine on the performance of the gas turbine, wherein in the effect calculation step, the introduction effect is calculated based on the performance data after the influence of the operating environment is removed in the external factor evaluation step.

6. The upgrade evaluation method according to claim 1, wherein the improvement function is a control logic of the gas turbine, and introduction and non-introduction of the improvement function is switched by execution and non-execution of the control logic, and in the effect calculation step, the introduction effect is calculated based on the difference in performance between when the control logic is executed and when the control logic is not executed.

7. The upgrade evaluation method according to claim 6, wherein in the effect calculation step, the introduction effect when the control logic is executed is calculated based on the difference in performance between a first performance when the control logic is not executed and a second performance when the control logic is executed, wherein the first performance is a performance immediately before or immediately after the control logic is executed.

8. The upgrade evaluation method according to claim 1, wherein the improvement function is a component to be introduced into the gas turbine, and in the effect calculation step, the introduction effect is calculated based on the difference in performance before and after the introduction of the component.

9. The upgrade evaluation method according to claim 1, wherein, in the effect calculation step, a time from a start-up of the gas turbine to a stop of the gas turbine is taken as a unit of the period, and the introduction effect is calculated with the time period.

10. The upgrade evaluation method according to claim 1, wherein, in the effect calculation step, the introduction effect is calculated each time a load of the gas turbine changes.

11. The upgrade evaluation method according to claim 1, wherein, in the effect calculation step, if a load of the gas turbine is constant, the introduction effect is calculated with the time period which is a smallest value possible to set to the computer.

12. An upgrade evaluation device comprising:

a communication unit that performs data communication with a control device which controls a gas turbine included in a plant;

a performance data acquisition unit that acquires performance data of the gas turbine via the communication unit, the performance data including at least an output efficiency of the gas turbine;

an effect calculation unit that calculates, based on the performance data, an introduction effect based on a difference in performance between when an improvement function of improving the performance of the gas turbine is introduced and when the improvement function is not introduced;

a consideration calculation unit that determines a size of a consideration for the introduction effect according to a degree of the introduction effect, wherein the consideration is exchanged between a provider and a recipient of the improvement function; and an operating state change determination unit that determines a physical change in an operating state of the gas turbine, wherein the effect calculation unit calculates the introduction effect at a time period, the time period being determined according to the physical change in the operating state of the gas turbine, when the time period has elapsed since a previous calculation of the introduction effect, and wherein the consideration calculation unit calculates the consideration based on the introduction effect calculated by the effect calculation unit each time the introduction effect is calculated at the time period.

13. The upgrade evaluation device according to claim 12, further comprising:

wherein the effect calculation unit sets the performance when the improvement function is not introduced as a standard, and calculates the introduction effect to be positive if the performance when the improvement function is introduced exceeds the standard, and calculates the introduction effect to be negative if the performance when the improvement function is introduced falls below the standard.

\* \* \* \* \*